Feb. 5, 1929.

J. F. BUHR 1,700,975

DRILL HEAD

Filed April 17, 1926   2 Sheets-Sheet 1

Inventor
Joseph F. Buhr

By

Attorneys.

Feb. 5, 1929.

J. F. BUHR 1,700,975

DRILL HEAD

Filed April 17, 1926

Inventor
Joseph F. Buhr

By

Attorneys

Patented Feb. 5, 1929.

1,700,975

UNITED STATES PATENT OFFICE.

JOSEPH F. BUHR, OF DETROIT, MICHIGAN.

DRILL HEAD.

Application filed April 17, 1926. Serial No. 102,618.

This invention relates to a drill head of a multiple type wherein a plurality of drill sockets are supported by the head and adapted to be driven by a train of gear wheels located in the head and driven from a drill press spindle or other source of power. Ordinarily such a drill head has its sockets supported by the head in such a manner that the parts of the head must be disassembled in order to remove the drill sockets, consequently considerable labor is involved and time lost when it becomes necessary to change the drill sockets or make any repairs in connection therewith.

My invention aims to provide a multiple drill including a holder in which drill sockets may be easily and quickly mounted and as readily removed, the drill sockets being unitary structures adapted for holding drills which may be mounted in the sockets and removed therefrom without the necessity of removing the sockets from the holder thereof. The holder also permits of easy access being had to the interior of the head for installing driving gears therein.

My invention further aims to provide a drill head with an interchangeable socket holder that may be easily removed to permit of another holder being substituted therefor. Very often a multiple drill head may require a greater or lesser number of drills and with the drill sockets uniform it will be only necessary to provide a holder to accommodate a desired number of sockets in order to provide a drill head having a suitable number of drills.

My invention includes certain other improvements and refinements that will be hereinafter specifically described and then claimed, and reference will now be had to the drawing wherein Figure 1 is a vertical sectional view of a drill head in accordance with this invention;

Figure 1:
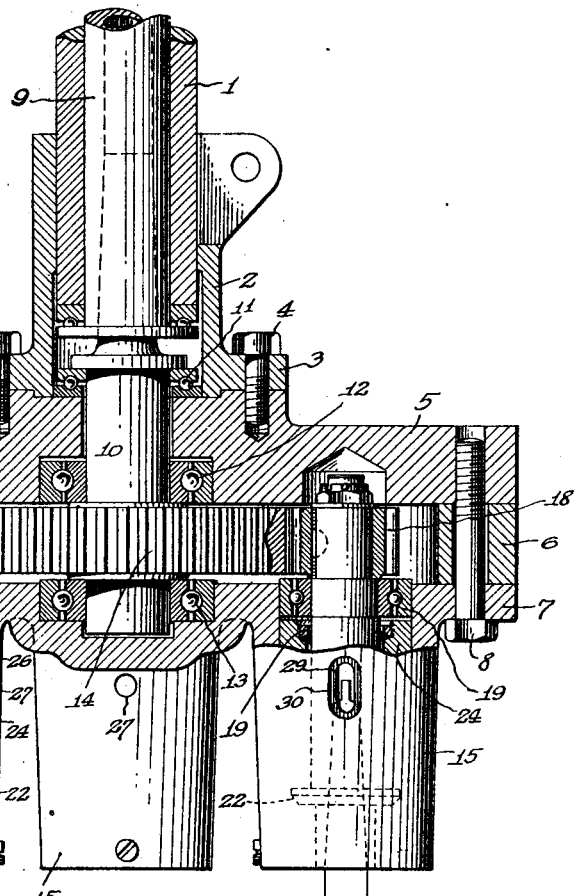
Figure 3:
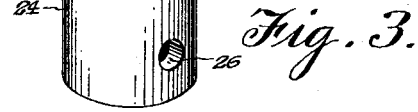
Fig. 3 is a perspective view of a spacing member used in connection with the socket.
Figure 2:
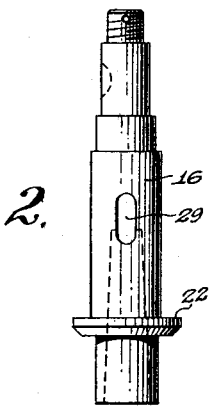
Fig. 2 is an elevation of a detached socket.
Figure 4:
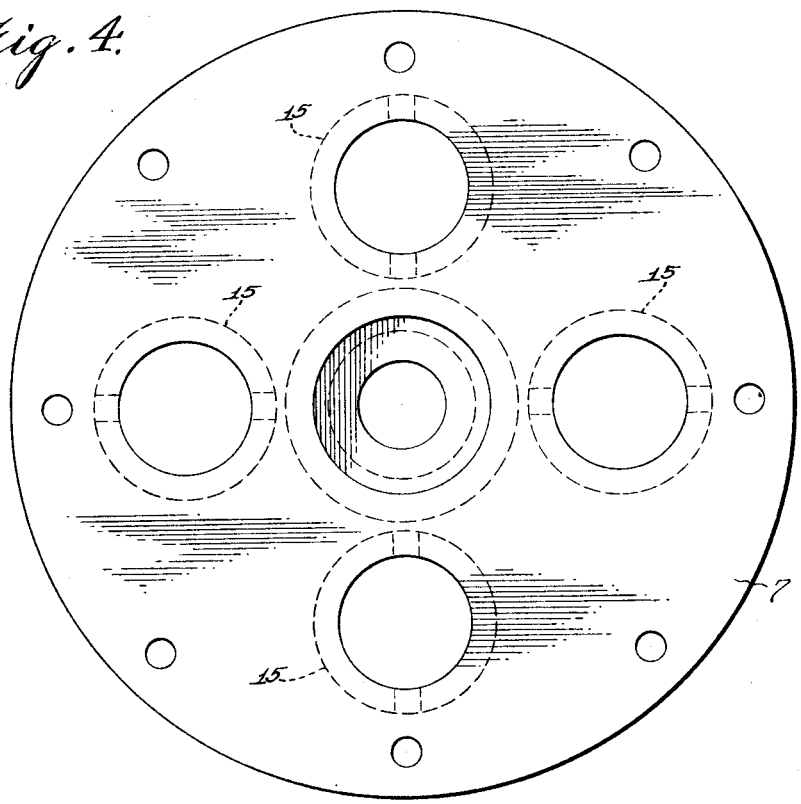
Fig. 4 is a plan of a holder.
Figure 5:
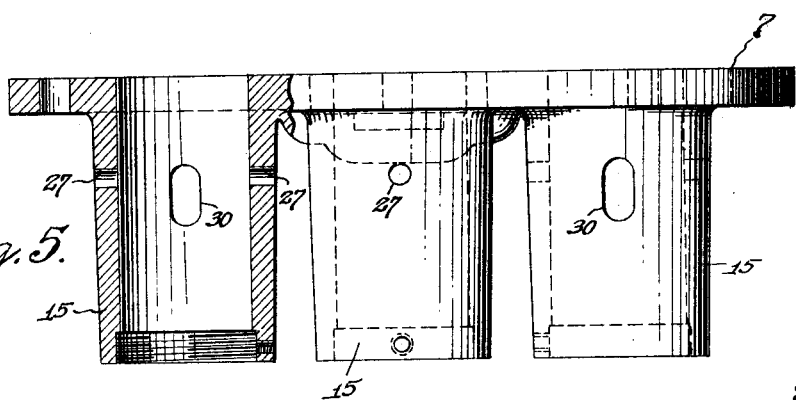
Fig. 5 is a side elevation of the same partly in section.

The reference numeral 1 denotes a sleeve portion of a drill press or other machine and this sleeve portion is adapted to be raised and lowered to adjust a drill head relative to a piece of work. Clamped or otherwise fixed on the lower end of the sleeve portion 1 is a supporting member 2 having a peripheral flange 3 to which is connected a drill head by screw bolts 4 or other fastening means.

The drill head comprises a body 5, an annular spacing member or ring 6 and a holder 7, the spacing member 6 being sandwiched between the body 5 and the holder 7 and these three elements connected together by screw bolts 8 which may be easily removed to permit of the holder 7 being attached and another holder substituted therefor.

Journaled in the sleeve portion 1 is a conventional form of spindle 9, and mounted in said spindle is a spindle extension or adapter 10 supported by thrust bearings 11 and radial bearings 12. The lower end of the adapter 10 is adapted to extend into a radial bearing 13, carried by the holder 7, and on the lower end of the adapter 10 is a sun gear 14 which is housed in the spacing member 6, between the body 5 and the holder 7.

The holder 7 is provided with a plurality of depending sleeve members 15 and in each sleeve member is journaled a drill socket 16 adapted for holding a drill 17. The drill socket 16 has its inner end stepped to accommodate a gear wheel 18 adapted to mesh with the sun gear 14 or intermediate gears (not shown). The socket member 16 is held concentric of the sleeve member 15 by radial bearings 19 and 20, the former being on the stepped end of the socket member and the latter adjacent the lower end of the socket member. The anti-frictional bearing 20 is retained within the sleeve member 15 by a countersunk stuffing box 21 and a peripheral collar 22 of the socket member bears directly on the anti-frictional member 20. Above the collar 22 is a thrust bearing 23 and between this bearing and the bearing 19 is a spacing sleeve or member 24 provided with a stuffing box 25 adapted to retain lubricant about the bearing 19 and in the housing formed by the spacing member 6. The spacing sleeve or member 24 has opposed openings 26 adapted to register with openings 27 in the sleeve member 15 to receive dowel pins 28, which hold the spacing sleeve 24 within the sleeve 15.

In order that the tangs of the drills 17 may be loosened in the socket member 16, said socket members are slotted, as at 29, and these slots are adapted to register with slots 30 in the depending sleeve members 15, as best shown in connection with the right hand sleeve member 15 of Fig. 1. It is obvious that the socket members 16 may be rotated to place the slots 29 in registration with the sleeve openings 26 so that the dowel pins may be driven inwardly when it is desired to remove the spacing sleeve 24 from the sleeve member 15, although the dowel pins 28 may be of such construction as to be extracted from each sleeve member.

From the foregoing it will be noted that the socket members are supporting within the holder 7 so that the holder, as a unitary structure may be detached and another socket equipped holder substituted therefor, such being necessary when it is desired to use a greater or lesser number of drills. This is accomplished without disassembling any other part of the drill head and is a distinct advantage in drill shop practice.

One embodiment of my invention has been illustrated, but it is to be understood that the structural elements are susceptible to such variations and modifications as fall within the scope of the appended claims.

What I claim is:—

1. A drill head comprising a holder having depending sleeves, bearings in the ends of each sleeve, a spacing ring between said bearings, and a socket member fitted into said ring and engaging said bearings, said sleeve and ring having aligned apertures, locking dowels for insertion in said apertures, said socket member having slots adapted to align with said apertures, whereby said dowels may be driven inwardly of said sleeve to release the ring from the sleeve.

2. A drill head comprising a holder having depending sleeves, bearings in the ends of each sleeve, a spacing ring between said bearings, and a socket member fitted into said ring and engaging said bearings, said sleeve and ring having aligned apertures, locking dowels for insertion in said apertures, said socket, ring and sleeve having aligned slots for permitting access to a drill within said socket, said socket slots being adapted for alignment with said apertures, whereby said dowels may be driven inwardly of said sleeve to release the ring from the sleeve.

In testimony whereof I affix my signature.

JOSEPH F. BUHR.